Inventor:
FRED COHEN
BY Abraham Sherman
Attorney

Inventor:
FRED COHEN
BY Abraham Sherman
Attorney

United States Patent Office 3,448,354

Patented June 3, 1969

3,448,354
SEMICONDUCTOR DEVICE HAVING INCREASED RESISTANCE TO SECOND BREAKDOWN

Fred Cohen, South Plainfield, N.J., assignor to Radio Corporation of America, a corporation of Delaware Filed Jan. 20, 1967, Ser. No. 610,670
Int. Cl. H01l 7/00, 11/00
U.S. Cl. 317—235 4 Claims

ABSTRACT OF THE DISCLOSURE

The resistance to second breakdown of a transistor having one or more emitter regions adjacent one face of a semiconductive body is improved by forming a groove in the one body face around each emitter region.

BACKGROUND OF THE INVENTION

*Field of the invention*

This invention relates to improved semiconductor devices, and improved methods of manufacturing them. More particularly, the invention relates to improved methods of fabricating transistors having increased resistance to second breakdown.

*Description of the prior art*

Some transistor types designed to handle relatively high power at relatively high frequencies have been limited in their operating characteristics by an undesirable phenomenon known as second breakdown. Second breakdown has been defined as a device condition in which the emitter current of a transistor concentrates in local regions and locally overheats the transistor, often causing serious impairment, or complete destruction of the device. Second breakdown is characterized by an abrupt decrease in the collector-emitter voltage $V_{ce}$ and a simultaneous increase in the collector current $I_c$. During forward-bias operation of the emitter, the transverse electric field in the base region focuses the flow of current from the emitter to the collector into a narrow region under the emitter edge. When the current flows through the space charge region at the base-collector junction, a significant amount of heat is generated by the current-voltage product. With current flow focused into a small area, the heating effect is localized and hot spots at the emitter-base interface result. The resistance of the hot spots drops as their temperature increases, so that they hog more of the emitter current, and the hot spot temperatures thus rise progressively until the device is destroyed. During reverse bias operation of the emitter, the direction of the transverse base field is reversed by the polarity change, thus focusing the emitter current into a small region around the center of the emitter. The same current crowding and hot spot phenomena described above thus occur, sometimes even at lower power levels than in forward bias operation. For a more detailed discussion of second breakdown, see Shockley U.S. Patent 3,286,138. When second breakdown occurs, the output impedance of the transistor changes almost instantaneously from a large value to a small limiting value. Second breakdown may be distinguished from normal transistor operation by the fact that once it occurs, the base current no longer controls normal collector current characteristics. Second breakdown is associated with imperfections in the device structure, and is usually more severe in multiple-diffused high-power devices.

Considerable improvement in the operating characteristics of high power, high frequency transistors has been achieved by increasing the ratio of emitter periphery to emitter area, and by subdividing the emitter region in order to improve the internal heat dissipating ability of the device. See for example Carley et al., "The Overlay Transistor," Electronics, Aug. 23, 1965, pp. 71–77. Although satisfactory transistors have been fabricated in this manner, still further improvement in power handling capabilities at high frequencies and resistance to second breakdown is desirable.

Accordingly, it is an object of this invention to provide improved semiconductor devices.

A further object is to provide improved methods of fabricating the improved aforesaid transistors.

SUMMARY OF THE INVENTION

A semiconductor junction device is provided comprising a crystalline semiconductive body; one or more diffused emitter regions immediately adjacent a face of the body; a base region immediately adjacent the face surrounding the emitter regions; and a collector region immediately adjacent the base region. Each emitter region is surrounded by a moat or groove in the body face. Preferably, the depth of the groove is 50% to 95% of the depth of the emitter region. The depth of the groove may be controlled by monitoring the reverse emitter-base breakdown voltage while the groove is being etched.

DESCRIPTION OF THE PREFERRED EMBODIMENTS—EXAMPLE

Figure 1A:
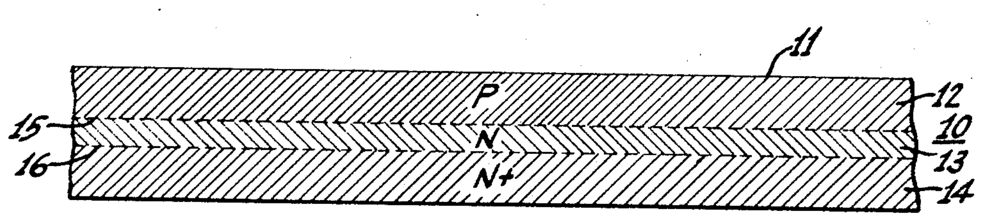
FIGURES 1*a*–1*g* are cross-sectional elevational views of a semiconductive body during successive steps in the fabrication of a semiconductor device according to one embodiment of the invention.

A crystalline semiconductive body such as a wafer or slice 10 (FIGURE 1*a*) is prepared with at least one major face 11. The precise size, shape, conductivity type and composition of the semiconductive body 10 are not critical in the practice of the invention. The semiconductive body 10 may, for example, be either P type or N type; be either monocrystalline or polycrystalline; and may consist of either elemental semiconductors such as germanium or silicon, alloyed semiconductors such as silicon-germanium alloys, or compound semiconductors such as the nitrides, phosphides, arsenides, or antimonides of boron, aluminum, indium, or gallium. Suitably, the body 10 is a circular slice of a semiconductor ingot having a diameter of about 1″, and a thickness of about 6 to 9 mils. In this example, the semiconductive body 10 consists of monocrystalline silicon.

A region or zone 12 of one type conductivity is provided in the body 10 immediately adjacent the face 11. In this example, the zone 12 is of P type conductivity. Suitably, zone 12 is about 1.3 to 1.6 mils thick, and has a resistivity of about 15 to 30 ohm-cm. Immediately adjacent zone 12 is a zone 13 of the other type conductivity. In this example, zone 13 is of N type conductivity. Suitably, zone 13 is about 2.4 to 2.8 mils thick, and has a resistivity of about 3 to 15 ohm-cm. The remainder of body 10 is a zone 14 which is of the same conductivity type as zone 13 (that is, N type in this example) but is more heavily doped, and hence has a low resistivity. In this example, zone 14 is about 4 mils thick, and has a resistivity of about .015 to .005 ohm-cm. Heavily doped low-resistivity N type regions are hereinafter termed N+ regions, while heavily doped low-resistivity P type regions are termed P+ regions. The fabrication of a semiconductive wafer with such zones or regions of different conductivity and resistivity is readily accomplished by standard diffusion techniques, or by the deposition of epitaxial layers on a semiconductive body. A PN junction 15 is formed at the boundary between the P type zone 12 and the N type zone 13. The interface or boundary 16 between the N type region 13 and the $N^+$ type region 14 may be termed an $N-N^+$ junction.

Figure 1B:
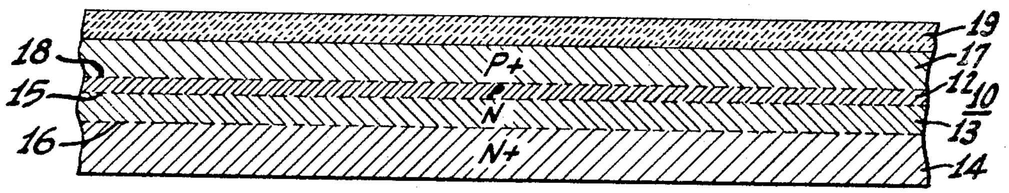

Referring now to FIGURE 1*b*, a low resistivity zone 17 is formed in body 10 immediately adjacent face 11. Zone 17 is of the same conductivity type as zone 12, and hence is P type in this example. However, the resistivity of zone 17 is low, being about 15 to 20 ohms per square at the surface 11, and hence zone 17 may be termed a $P^+$ zone. Zone 17 may be formed by standard diffusion techniques, and is thinner than zone 12. In this example, zone 17 is about 0.7 to 0.9 mil thick. The interface or boundary 18 between the P type region 12 and the $P^+$ type region 17 may be termed a $P-P^+$ junction. A coating 19 of an inert masking material is now deposited on face 11. Coating 19 may for example consist of silicon oxide, silicon nitride, magnesium oxide, magnesium fluoride, or the like. In this example, coating 19 consists of silicon oxide. When the semiconductive body 10 consists of silicon, as in this example, a silicon oxide coating is conveniently formed by heating the body 10 in an oxidizing ambient such as air or steam. When the semiconductive body 10 consists of other materials, a silicon oxide coating may be deposited thereon by heating the body in the vapors of a siloxane compound, as described by E. L. Jordan and D. J. Donahue in U.S. Patent 3,089,793, issued May 14, 1963.

Figure 1C:
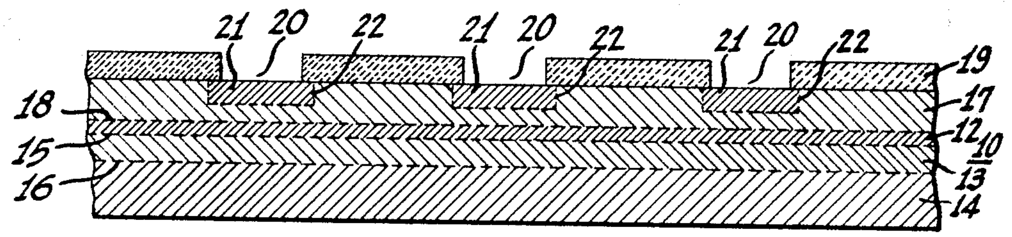

Standard photolithographic techniques known to art are used to form a first set of windows 20 (FIGURE 1*c*) in the masking layer 19. Predetermined portions of face 11 are exposed by the windows 20. The precise size, shape and number of windows 20 are not critical, and are varied according to the size, shape and number of separate emitting regions desired. In this example, nine windows 20 are formed in a 3 x 3 array, each window 20 being a square about 2 mils on edge. A conductivity modifier capable of inducing in body 10 conductivity of type opposite to zone 17 is now diffused into the exposed portions of face 11 to form a plurality of discrete emitter regions 21 in zone 17. The diffusion step is performed under such conditions of temperature and source concentration that the regions 21 are of low resistivity, and hence may be termed $N^+$ regions in this example. A rectifying barrier or $PN^+$ junction 22 is formed at the boundary between each emitter region 21 and zone 17. The thickness of the emitter regions 21 is less than the thickness of zone 17. In this example regions 21 are suitably about 0.6 to 0.7 mil thick. The thickness of the various zones and regions in the drawing are not to scale, having been exaggerated for greater clarity.

Figure 1D:
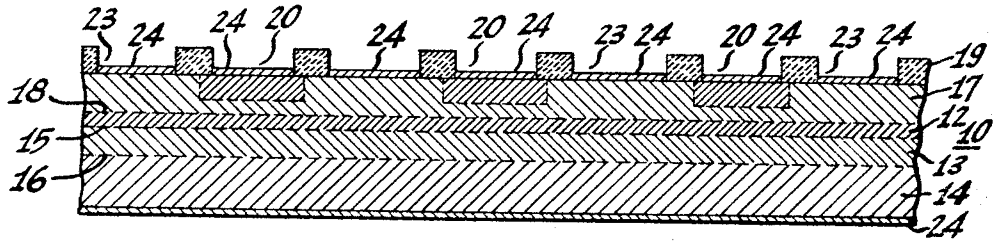

Standard photolithographic masking and etching techniques are now utilized to form a second set of windows 23 (FIGURE 1*d*) in the masking layer 19. The precise size, shape and number of windows 23 are not critical. Conveniently, windows 23 are formed in a regular array, such as a grid, between the first set of windows 20, so that the portions of face 11 exposed by windows 23 are all external the emitter regions 21.

The semiconductive body 10 is now immersed in an electroless metal plating bath (not shown), so that a thin film 24 of metal such as nickel or cobalt is deposited on those portions only of face 11 which are exposed by the first set of windows 20 and the second set of windows 23. Those metal films 24 deposited within the first set of windows 20 are completely internal and in contact with the diffused emitter regions 21, while those metal films deposited within the second set of windows 23 are completely external the emitter regions 21, and are in direct contact with the base region 17. The surface of body 10 opposite face 11 is simultaneously covered by a metal film 24.

Figure 1E:
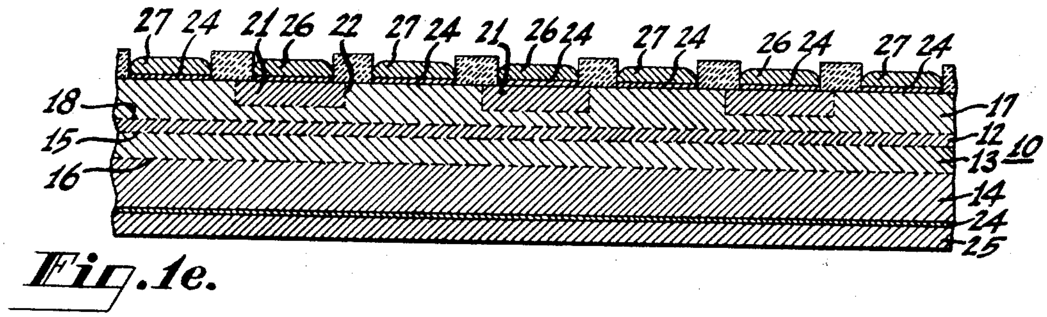

Referring now to FIGURE 1*e*, the semiconductive body 10 is now dipped into a metallic melt which may for example consist of lead, tin, lead-tin alloys, and the like.

In this example, the metallic melt consists of lead. The molten metal adheres only to the metal films 24, and does not adhere to the insulating coating 19. On removing the body 10 from the melt, the adhering metal solidifies and forms a metallic layer 25 on the face of body 10 opposite face 11, as well as a plurality of relatively thick metallic electrodes on the face 11 over the metal films 24. The electrodes thus formed may be considered as being in two sets, depending on whether they are internal or external the emitter regions. One set of metallic electrodes 26 is completely internal the set of diffused emitter regions 21, and serves as the emitter electrode. The remaining set of metallic electrodes 27 is completely external the set of diffused emitter regions 21, and serves as the base electrode. Other electrode configurations such as single comb and double comb structures may be used, and all the base electrodes 27 on face 11 may be interconnected to form a single base electrode.

Figure 1F:
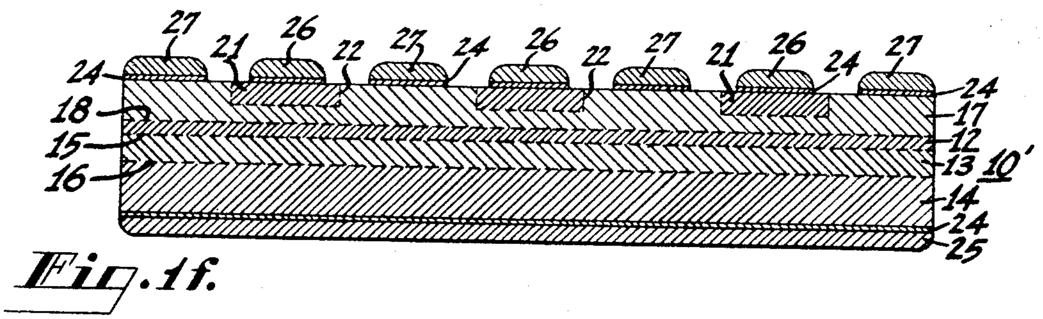

The semiconductive body 10 is now scribed and diced into a plurality of pellets or dice, so that each individual die 10' (FIGURE 1*f*) contains a set of emitter electrodes 26 and a set of base electrodes 27. Standard masking and etching techniques are now utilized to remove those portions of the masking coating 19 which were between the electrodes 26 and 27, leaving each die 10' as in FIGURE 1*f*.

Figure 1G:
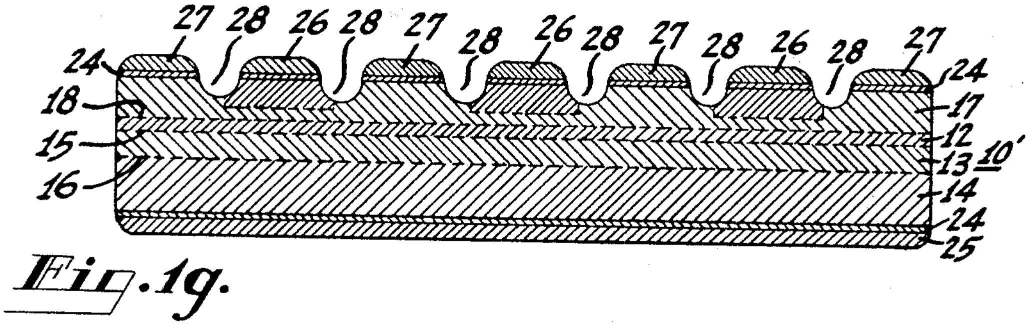

Referring now to FIGURE 1*g*, each die 10' is immersed in an etchant bath which is capable of etching the particular semiconductive body utilized, but is not capable of etching through the inert masking coating 19 or through the electrodes 26 and 27. In this example, a suitable etching bath consists of an aqueous solution of 90 nitric acid—10 hydrofluoric acid by volume. A groove 28 is thus formed around the periphery of each of the electrodes 26 and 27. Preferably the depth of groove 28 is less than the depth of each emitter region 21. Advantageously, the etching is controlled so that the depth of the groove 28 is about 50 to 95% of the depth of the emitter regions 21. Since each of electrodes 26 covers most of the surface of a discrete emitter region 21, the effect of this etching is to form a groove or moat 28 around the periphery of each of the discrete emitter regions 21.

The direct measurement of the depth of grooves 28 is inconvenient, and may be avoided by monitoring the reverse breakdown voltage between one emitter electrode 26 and an adjacent base electrode 27. For example, in the device of this embodiment, the reverse breakdown voltage between an emitter electrode 26 and an adjacent base electrode 27 is about 8 to 12 volts prior to the etching step. As the etching proceeds, and the grooves 28 around each emitter electrode become deeper, this reverse breakdown voltage increases. Suitably, in this embodiment the etching is ended when the reverse breakdown voltage reaches a value of about 20 to 70 volts. The particular values for the reverse breakdown thus obtained will vary when different semiconductor materials and different charge carrier concentrations are utilized. Suitably, the etching of the grooves is ended when the base-emitter breakdown voltage is thus increased by the grooves formed around each emitter region by about 50% to 600% of its original value prior to the etching of the grooves.

To complete the device, a common electrical connection (not shown) is made to all the emitter electrodes 26 on die 10'. Another electrical connection (not shown) is made to the base electrodes 27 on die 10'. The remaining steps of mounting each die 10' with the collector electrode 25 down on a metallic header, and casing the device, are accomplished by standard methods of the art.

A feature of the invention is that the electrical characteristics of the device can be adjusted by varying the depth of the grooves 28. This groove depth can be conveniently fixed by ending the etching step when the reverse breakdown voltage between an emitter electrode and an adjacent base electrode has reached a predetermined value.

It has unexpectedly been found that the provision of a groove or moat around each diffused emitter region increases the second breakdown power capability of the transistor by about 100% to 250%. For example, when a conventional diffused emitter transistor similar to that described in the above example is given a reverse bias between collector and emitter of 150 volts, and 0.3 ampere of current is passed in the forward direction from the emitter to the collector in a single one-second pulse, the device will exhibit second breakdown. In contrast, when a comparable transistor according to this example having a groove around each diffused emitter region (the depth of the groove being about 50 to 95% of the depth of the emitter region) was given a reverse bias of 150 volts between the collector and emitter, a current of 0.6 to 1.0 ampere could be passed in the forward direction from emitter to collector in a single one-second pulse without causing second breakdown of the device. The exact mechanism by which grooves around the diffused emitter regions improve resistance to second breakdown is not yet clear. It is theorized that the grooves provide a degree of thermal isolation between separate emitter regions, and this improves the resistance of the device to thermal breakdown.

I claim:

1. In a transistor comprising:
- a crystalline semiconductive body having two opposing major faces,
- a base zone of given conductivity type immediately adjacent one said major face,
- a collector zone of opposite conductivity type between said first zone and said opposing major face,
- a rectifying barrier between said first and said second zones,
- at least one diffused emitter region of said opposite conductivity type in said first zone immediately adjacent said one major face,
- a rectifying barrier between each of said diffused emitter regions and said base zone,
- an electrical connection to said base zone,
- an electrical connection to said collector zone, and
- an electrical connection to said diffused emitter;
- the improvement comprising a groove in said one major face around the periphery of each said diffused emitter region, the depth of said groove being 50% to 95% of the depth of said emitter region.

2. A semiconductor device as in claim 1, wherein said base zone includes a high conductivity layer immediately adjacent said one major face, and said collector zone includes a high conductivity layer immediately adjacent said opposing major face.

3. In a method of fabricating a transistor comprising: preparing a given conductivity type crystalline semiconductive body with two opposing major faces,
- forming in said body a base zone of opposite conductivity type immediately adjacent one said major face,
- forming in said base zone at least one diffused emitter region of said given conductivity type immediately adjacent said one major face,
- forming on said one face a first set of electrodes, each of said electrodes being internal a different one of said diffused emitter regions, and
- forming on said one face a second set of electrodes, each of said second electrodes being external said diffused emitter regions and in contact with said base zone;
- the improvement comprising measuring the reverse breakdown voltage between one of said first set of electrodes and an adjacent one of said second set of electrodes,
- etching said semiconductive body to form a groove around the periphery of each of said diffused emitter regions while monitoring said reverse breakdown voltage,
- ending said etching when said reverse breakdown voltage has increased to a predetermined value, and
- forming a first electrical connection to said first set of electrodes, a second electrical connection to said second set of electrodes, and a third electrical connection to the other said major face.

4. The method as in claim 3, wherein said reverse breakdown voltage is increased by said groove etching step by about 50% to 600% of its original value.

References Cited

UNITED STATES PATENTS

| | | | |
|---|---|---|---|
| 3,341,743 | 9/1967 | Ramsey | 317—101 |
| 3,360,696 | 12/1967 | Neilson | 317—235 |
| 3,381,182 | 5/1968 | Thornton | 317—234 |
| 2,831,787 | 4/1958 | Emeis | 317—235 |
| 2,911,706 | 11/1959 | Wertwijn | 29—25.3 |
| 3,088,888 | 5/1963 | Leff | 204—143 |
| 3,286,138 | 4/1966 | Shockley | 317—235 |

OTHER REFERENCES

Schafft: "Second Breakdown," pp. 128–137 of IRE Transactions on Election Devices, March 1962.

JOHN W. HUCKERT, *Primary Examiner.*

S. BRODER, *Assistant Examiner.*

U.S. Cl. X.R.

29—25.3